No. 626,447. Patented June 6, 1899.
T. G. STRATER.
COUPLING FOR MULTIPLE DELIVERY FAUCETS.
(Application filed Mar. 30, 1899.)
(No Model.)
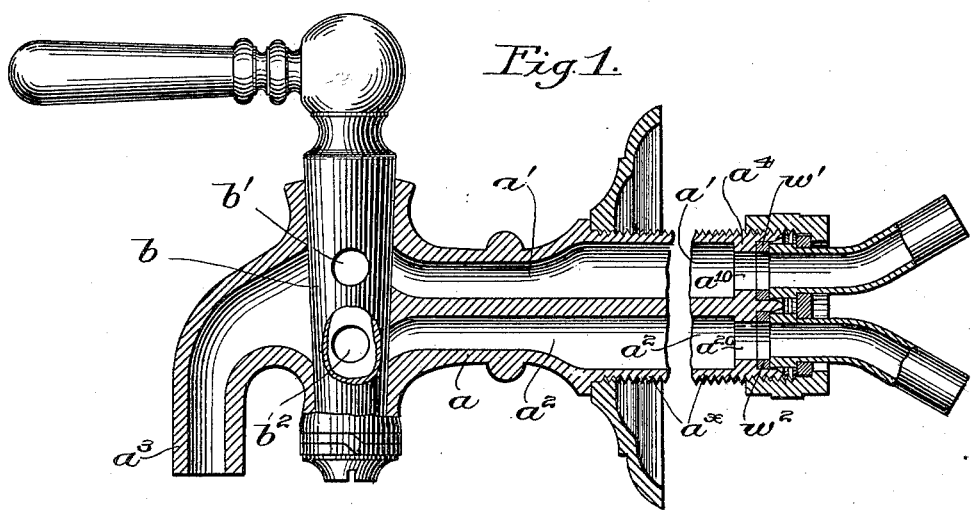
Inventor
Theodore G. Strater

UNITED STATES PATENT OFFICE.

THEODORE G. STRATER, OF BOSTON, MASSACHUSETTS.

COUPLING FOR MULTIPLE-DELIVERY FAUCETS.

SPECIFICATION forming part of Letters Patent No. 626,447, dated June 6, 1899.

Application filed March 30, 1899. Serial No. 711,059. (No model.)

*To all whom it may concern:*

Be it known that I, THEODORE G. STRATER, of Boston, county of Suffolk, and State of Massachusetts, have invented an Improvement in Couplings for Multiple-Delivery Faucets, of which the following description, in connection with the accompanying drawings, is a specification, like letters on the drawings representing like parts.

This invention relates to that type of faucets which are provided with a plurality of inlet-passages controlled by a suitable valve, whereby fluids may be drawn at will from different sources of supply; and my invention has for its object the production of a novel, simple, and effective coupling device for use with such faucets.

The coupling embodying my invention has all of the advantageous features of the well-known single-duct swivel-coupling and obviates the use of the inconvenient devices now commonly employed to connect a faucet of the before-mentioned type with its several supply sources or feeders.

Various novel features of my invention will be hereinafter described in the specification and particularly pointed out in the following claims.

Figure 1 is a longitudinal vertical sectional view of a multiple-delivery faucet and a coupling therefor embodying one form of my invention. Fig. 2 is an inner end elevation of the coupling detached, and Fig. 3 is a diametral sectional view of the coupling on the line $x\ x$, Fig. 2.

Referring to Fig. 1, the barrel $a$ of the faucet, having two inlet-passages $a'\ a^2$ leading from the end of the threaded shank $a^\times$, the delivery duct or nozzle $a^3$, and the interposed hollow controlling-valve $b$, having upper and lower openings $b'\ b^2$ diametrically opposite and adapted to register with the inlets $a'\ a^2$, respectively, may be and is of substantially usual or well-known construction. The end of the shank $a^\times$, however, is herein shown as closed by a diaphragm $a^4$, having counterbored holes $a^{10}\ a^{20}$ registering with the passages $a'\ a^2$, the counterbores receiving washers $w'\ w^2$, against which the inner ends of the swiveled connections to be described are forced by the coupling.

The coupling as herein shown comprises a cup-like or chambered nut $c$, interiorly threaded at $c'$ and having at one end an inturned annular flange $c^2$, which forms a seat for a disk or carrier $c^3$, provided with holes to receive the connections $d\ e$, shown as lengths of pipes having heads $d'\ e'$ at the ends within the nut and at the inner side of the disk $c^3$, the outer ends of the pipes being preferably slightly bent, as shown, to facilitate their attachment to tubing, (not shown,) which connects the faucet with the casks or other sources of supply of the liquids to be drawn. The connections $d$ and $e$ are individually swiveled in the disk $c^3$, and the latter is in turn swiveled in the nut $c$, so that the one may be rotated relatively to the other, and the connections can be turned relatively to each other and also to the nut and disk. By such construction great facility and ease of handling are effected, and a simple, durable, and tight coupling is produced.

It will be understood that the threaded shank of the faucet is screwed into a bar-fixture or other support and then the coupling-nut $c$ is screwed on until the headed ends of the connections $d$ and $e$ are pressed tightly against the washers $w'$ and $w^2$ by means of the disk $c^3$, the latter being turned relatively to the nut to bring said connections into such position that their headed ends can enter the counterbored holes $a^{10}$ and $a^{20}$ in the end of the faucet-shank.

When the parts are snugly held in place, and before final tightening of the nut, the connections $d$ and $e$ are individually turned to place their exposed ends in the position most convenient for the attachment thereto of the tubing intermediate the coupling and the sources of liquid-supply.

Should it be necessary to remove the faucet for any reason, it will be manifest that rotation of the coupling-nut will not twist or displace the connections extended through the disk $c^3$, and when the faucet is replaced the coupling can be attached at once.

No soldering or other permanent jointing of the parts is necessary with my invention.

While I have shown two connections $d$ and $e$, forming a part of the coupling, it is obvious that a greater number may be used, if desired, without departing from the spirit and scope of my invention.

Having described my invention, what I claim as new, and desire to secure by Letters Patent, is—

1. A coupling for multiple-delivery faucets, comprising an attaching member and a carrier, adapted to have relative rotative movement, and a plurality of tubular connections supported by and extended through the carrier.

2. A coupling for multiple-delivery faucets, comprising a nut-like attaching member and a carrier, adapted to have relative rotative movement, and a plurality of tubular connections supported by and swiveled in said carrier.

3. A coupling for multiple-delivery faucets, comprising a nut-like attaching member having at its outer end an annular inturned seat, a relatively rotatable disk sustained by the seat, and a plurality of connection-tubes extended through and supported by the disk and headed at their inner ends.

4. A multiple-delivery faucet having a shank provided at its end with a plurality of adjacent inlets, combined with a detachable coupling comprising an attaching member to engage the shank, a relatively rotatable carrier mounted therein, and a plurality of tubular connections extended through said carrier and adapted at their inner ends to register with the faucet-inlets.

5. A multiple-delivery faucet having a shank provided at its end with a plurality of adjacent counterbored inlets, combined with a detachable coupling comprising a chambered attaching-nut, a rotatable disk therein, and a plurality of tubular connections extended through said disk and having enlarged inner ends to enter the counterbored inlets of the faucet.

In testimony whereof I have signed my name to this specification in the presence of two subscribing witnesses.

THEODORE G. STRATER.

Witnesses:
 GEO. W. GREGORY,
 EMMA J. BENNETT.